July 2, 1963 W. O. RAMSER 3,095,622

APPARATUS FOR MANUFACTURE OF ALLOYED SEMICONDUCTOR DEVICES

Filed June 10, 1959

INVENTOR.
WALTER O. RAMSER
BY
Francis L. Masselle
ATTORNEY

United States Patent Office 3,095,622

Patented July 2, 1963

3,095,622

APPARATUS FOR MANUFACTURE OF ALLOYED SEMICONDUCTOR DEVICES

Walter Otto Ramser, Nurnberg, Germany, assignor to Clevite Corporation, Cleveland, Ohio, a corporation of Ohio Filed June 10, 1959, Ser. No. 819,365
Claims priority, application Germany June 11, 1958
8 Claims. (Cl. 22—75)

This invention relates to methods and apparatus for the manufacture of semiconductor devices. In applicant's copending application Serial No. 819,364 filed June 10, 1959 entitled Apparatus for Alloying P-N Junctions, there is disclosed a novel technique for forming P-N junctions on bodies of semiconductive material by alloying with suitable donor or acceptor impurity agents. This technique involves the use of a plate containing at least one bore adapted to coaxially receive a semiconductor wafer and an alloying mold element of a highly polished material which is not wet by the alloying substance in molten condition and is capable of withstanding the temperature encountered in the alloying process. The mold element contains a small opening corresponding in dimension and location with the alloy region to be found on the wafer into which a pill of alloying material is inserted. An horological "hole jewel" is admirably suited for the mold element.

The semiconductor body or wafer to be alloyed is inserted into the bore in the plate and the mold element is thereafter inserted into the aperture so that it abuts the face of the wafer. A pill of alloying material is inserted into the hole in the mold element and then the plate with the wafer and mold element in position is heated to the alloying temperature whereupon the pill of alloy material fuses, flows from the opening in the mold element onto the surface of the semiconductor wafer and alloys therewith.

The use of these mold elements has many advantages as regards the production of uniform semiconductor devices as explained in the aforementioned application. However, the filling of the individual mold elements is rather a time-consuming and tedious process particularly because of the extremely small size of the components involved.

It is the fundamental object of the present invention to facilitate the filling of these mold elements.

More specifically, it is an object of the invention to provide apparatus for automatically and rapidly filling mold elements with alloying material on a mass production basis.

These and other objects of the invention are accomplished by apparatus for manufacture of semiconductor devices according to the present invention which comprises means for moving to and from a loading position alloy mold elements having an opening therein for containment of alloying material and means at the loading position for inserting into the openings of the mold elements a predetermined quantity of such alloying material.

The invention also contemplates a method for the manufacture of P-N junctions for semiconductor devices which comprises filling the bore of an horological hole jewel with a predetermined quantity of an alloying material; placing the jewel in abutment with a major surface of a wafer of semiconductor material with the bore of the jewel substantially perpendicular to the major surface; and heating the wafer and jewel to alloying temperature.

Additional objects of the invention, its advantages, scope, and the manner in which it may be practiced will be apparent to those conversant with the art from the following description and subjoined claims taken in conjunction with the annexed drawings, in which, FIGURE 1 is a vertical section view of an exemplary form of apparatus as contemplated by the present invention;

Figures 2, 3:
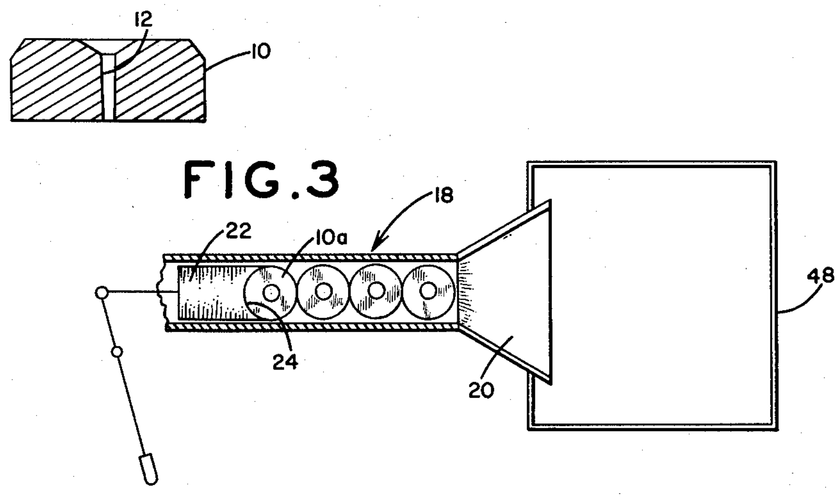
FIGURE 2 is a sectional view taken on line 2—2 in FIGURE 1.
FIGURE 3 is a cross-sectional view of a mold element of the type employed with apparatus shown in FIGURES 1 and 2.

Referring first to FIGURE 3 there is illustrated an alloying mold element 10 of the type contemplated for use with the present invention, preferably taking the form of an horological "hole jewel." As is well-known in the horological art, watch jewels suitable for the purpose of this invention are readily available in a wide variety of sizes and containing pivot bores of practically any desired diameter. Such jewels, or stones as they are sometimes called, are made of ruby or sapphire material (corundum) usually synthetic. Jewel 10 is a small discoid body of highly polished corundum containing a coaxial bore 12 having a diameter conforming to that of the alloy region to be formed on the semiconductor wafer. The diameter of the jewel is the same as that of the semiconductor wafer to be alloyed.

Figure 1:
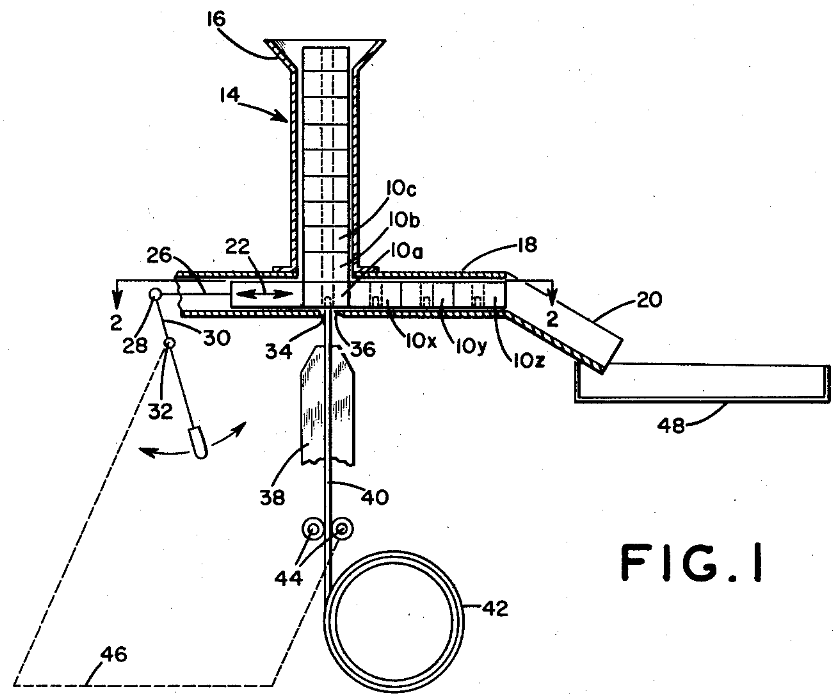

Referring now to FIGURE 1, the apparatus for inserting alloying material into the bore 12 of the mold element 10 consists of a magazine or hopper 14 adapted to contain a plurality of mold elements **10*a*, 10*b*, 10*c*, etc. in stacked coaxial relation and means for sequentially moving individual mold elements to a loading position where the alloying material, in the form of wire or powder is introduced as will now be explained. Magazine 14 takes the form of a vertically disposed hollow cylinder having an internal diameter slightly larger than the outer diameter of the mold elements 10**.

To facilitate loading of the mold elements into the magazine, its upper end may be conically flared upwardly and outwardly as indicated at 16. Adjacent the lower end of magazine 14 is a transverse guide channel 18 preferably of rectangular cross-section. Magazine 14 is mounted atop guide channel 18, the top wall of which is apertured to provide communication between the magazine and the chute. At the discharge end, channel 18 is formed with a downwardly sloping chute portion 20 leading to a suitable receptacle for loaded mold elements. At the opposite side of magazine 14 from the discharge end of guide channel 18 is a plunger 22 having a configuration conforming generally to the interior of the chute and adapted to slidably reciprocate therein as indicated by the double-headed arrow. As best appears in FIGURE 2 the forward end 24 of plunger 22, i.e., the end facing discharge chute 20, preferably is arcuately shaped to conform to the discoid shape of mold elements 10. Plunger 22 is reciprocably driven by any suitable mechanism represented schematically in FIGURE 1 by a connecting rod 26 extending rearwardly from the plunger and pivotally connected at 28 to a rocker arm 30 pivotally mounted at point 32 intermediate its ends.

It will be understood from the structure thus far described that upon a forward stroke (to the right in FIGURE 1) of plunger 22 the mold element **10*a* occupying the loading position directly beneath magazine 14 is forwardly displaced to the position occupied by element 10X, elements 10X, 10Y and 10Z moving toward discharge chute 20. As plunger 22 is withdrawn to the position shown in the drawings, the entire stack of mold elements in magazine 14 moves downwardly, the lower-most mold element 10*b* moving into loading position in guide channel 18**.

The bottom wall of channel 18 contains a small aperture 34 coaxially disposed with respect to magazine 14 and the aligned bores of the jewels stacked therein. A sharpened cutting edge 36 is provided at the margin of aperture 34 nearest the discharge end of the channel. Directly beneath magazine 14 and coaxially aligned with aperture 34 is a wire guide means 38 adapted to guide wire 40 of alloying material into the aperture. Wire 40 may be supplied from a suitably positioned, rotatably mounted coil 42. Wire from coil 42 is fed between and driven by a pair of feed rolls 44 mounted beneath wire guide 38. As indicated schematically by the broken line 46, drive rolls 44 and plunger 22 are operatively functionally related by a suitable linkage so that wire 40 will be incrementally advanced a predetermined amount upon each stroke of the plunger.

The operation of the apparatus described is as follows: beginning with the moving parts in the position shown in FIGURE 1, mold element 10*a* occupies the loading position in channel 18; the upper end of alloy wire 40 projects through aperture 34 in the bottom wall of the channel and a predetermined length thereof extends into the bore 12 of the mold element 10*a*. As plunger 22 moves forwardly, to the right, mold element 10*a* is displaced to the right from the loading position. As this occurs the alloy wire 40 encounters the cutting edge 36 and is sheared off flush with the lower surface of the mold element. On completion of the forward travel of plunger 22, filled mold element 10*a* is moved to a position just beyond the lower end of magazine 14; at this stage mold elements 10*b*, 10*c*, etc., in the magazine rest upon the plunger. As the plunger is withdrawn to the left the entire stack drops downwardly, the lower mold element, 10*b*, moving into the loading position; the linkage 46 advances alloying wire 40 by the desired amount and the process is repeated. As the operation continues the filled mold elements are progressively pushed toward the discharge end of channel 18 from whence they drop into a receptacle 48.

It will be appreciated that the diameter of wire 40 should be such as to form a snug fit in the bore of the mold elements so that it will be frictionally retained therein. Also either or both the plunger operation and the wire advance may be accomplished manually if desired.

The alloying material may also be in the form of a powder. In this case each mold element 10 would contain a blind bore or cavity rather than a through bore 12. Wire guide 32 and coil 42 would be replaced by a suitable nozzle which would extend up into aperture 34 and terminate flush with the inner surface of the bottom wall of the channel 18. The nozzle employed would be adapted to function as a pressing or tamping foot also. Mechanism may be provided for advancing the nozzle so as to tamp down the charge expressed into the cavity of the mold element.

Still further variations are possible; thus, for example, the gravity feed vertical magazine 14 could be a feeding mechanism adapted to move the mold elements horizontally into the loading position. Likewise several mold elements might be filled at the same time using several magazines or one magazine feeding several stacks of jewels. In this manner a single driving mechanism for the plunger and wire or nozzle could be used to operate a bank of plungers and a corresponding number of spools of wire or nozzles.

In addition to those previously set forth the invention has another advantage in the fact that the alloying material loaded in the mold elements presents a freshly cut surface for alloying to the wafer whereas the pills or pellets ordinarily employed are usually oxidized before use.

While there have been described what at present are believed to be the preferred embodiments of this invention, it will be obvious to those skilled in the art that various changes and modifications may be made therein without departing from the invention; it is aimed, therefore, to cover in the appended claims all such changes and modifications as fall within the true spirit and scope of the invention.

What is claimed and desired to be secured by United States Letters Patent is:

1. Apparatus for manufacture of semiconductor devices comprising: a plurality of coaxially apertured discoid mold elements constructed of highly polished refractory material not wet by molten alloy materials effective to form rectifying junctions in semiconductors; a tubular magazine open at at least one end and adapted to contain a plurality of said mold elements in coaxial juxtaposition; guide means adjacent said one end of said magazine and extending substantially perpendicular thereto, said one end of the magazine opening into said guide means, said guide means having one surface remote from said magazine spaced from said one end thereof by a distance at least slightly larger than thickness of one of said elements but less than twice said thickness; means defining an aperture in said one surface of the guide means coaxially aligned with said magazine, at least one side of said aperture being bounded by a cutting edge substantially flush with said bottom surface; wire guide means disposed adjacent said one surface and coaxially aligned with said aperture therein and said tubular magazine; and plunger reciprocably mounted for movement in said guide means along a rectilinear path with the head end of said plunger traversing to and fro across said open end of the magazine.

2. Apparatus according to claim 1 including means for reciprocating said plunger and means operative in timed relation to the reciprocation of said plunger for incrementally advancing wire through said wire guide means.

3. Apparatus for manufacture of semiconductor devices comprising: a plurality of coaxially apertured discoid mold elements constructed of highly polished refractory material not wet by molten alloy materials effective to form rectifying junctions in semiconductors; a vertical tubular magazine open at its bottom end and adapted to contain a plurality of said mold elements in coaxial stacked relation; horizontal guide means adjacent the lower end of said magazine, said lower end of the magazine opening into said guide means, said guide means having a bottom surface spaced from the lower end of said magazine by a distance at least slightly larger than thickness of one of said elements but less than twice said thickness; means defining an aperture in said bottom surface of the guide means coaxially aligned with said magazine, at least one side of said aperture being bounded by a cutting edge substantially flush with said bottom surface; wire guide means disposed beneath said bottom surface and coaxially aligned with said aperture therein and said tubular magazine; a plunger reciprocably mounted for movement in said guide means along a rectilinear parth with the head end of said plunger traversing to and fro across said open end of the magazine; power means for reciprocating said plunger; and means operative in timed relation to the reciprocation of said plunger for incrementally advancing wire through said wire guide means.

4. Apparatus for manufacture of semiconductor devices comprising: a vertical tubular magazine adapted to contain a plurality of substantially identical horological hole jewels in coaxial stacked relation; horizontal guide means, of substantially rectangular cross-section, the lower end of said magazine opening into said guide means through the top wall thereof, the bottom wall of the guide means being spaced from the lower end of said magazine by a distance at least slightly larger than thickness of one of said elements but less than twice said thickness; means defining an aperture in said bottom wall coaxially aligned with said magazine, one side of said aperture being bounded by a cutting edge substantially flush with said bottom wall; wire guide means disposed beneath said guide means and coaxially aligned with said tubular magazine; a plunger reciprocably mounted for movement in said guide means in a rectilinear path to and fro across the open end of said magazine between an advance position in which the plunger extends across and substantially obstructs said open end and a retracted position in which the head end of the plunger is withdrawn completely clear of said open end, the advancing movement of said plunger being toward said cutting edge.

5. Apparatus for manufacture of semiconductor devices, comprising: a plurality of substantially identical discoid mold elements, each formed of a highly polished refractory material not wet by molten alloying materials for forming rectifying junctions in semiconductors and having therein a coaxially disposed bore for the containment of a quantity of such alloying material; a magazine containing said mold elements; means for inserting into the bore of one of said mold elements, at a loading position, a predetermined quantity of such an alloying material in the form of a continuous length of wire one end of which is inserted into the bore of the element when the element is in its loading position; and means cyclically operative in timed relation to said inserting means for displacing said one element from said loading position and enabling replacement thereof with another of said elements from said magazine, and for severing said one end of the wire prior to replacement thereof with another of said elements from said magazine.

6. Apparatus according to claim 5, further characterized by means for shearing off said one end of said wire by the displacement of said one element.

7. Apparatus according to claim 6 wherein said elements are corundum horological hole jewels vertically stacked in said magazine in coaxial relation and consecutively incrementally moved downwardly into said loading position at least partially by the force of gravity in consequence of the displacement of elements from said loading position.

8. Apparatus for manufacture of semiconductor devices, comprising: a plurality of substantially identical discoid mold elements, each formed of a highly polished refractory material not wet by molten alloying material for forming rectifying junctions in semiconductors and having therein a coaxially disposed bore for the containment of a quantity of such alloying material; a tubular magazine containing said mold elements in stacked relation with the respective bores therein coaxially aligned; means for inserting axially into the opening of one of said elements, at a loading position, a predetermined quantity of such an alloying material in a wire-like solid phase; and means cyclically operative in timed relation to said inserting means for displacing said one element from said loading position and enabling replacement thereof with another of said elements from said magazine, including means for severing said one end of said wire by the displacement of said one element.

References Cited in the file of this patent

UNITED STATES PATENTS

| | | |
|---|---|---|
| 776,072 | Krause | Nov. 29, 1904 |
| 1,597,928 | Simons | Aug. 31, 1926 |
| 2,350,179 | Marvin | May 30, 1944 |
| 2,422,439 | Schwarzkopf | June 17, 1947 |
| 2,423,151 | Miller | July 1, 1947 |
| 2,632,216 | McQuaid | Mar. 24, 1953 |
| 2,716,790 | Brennan | Sept. 6, 1955 |
| 2,787,817 | Brennan | Apr. 19, 1957 |
| 2,933,787 | Ackerman | Apr. 26, 1960 |
| 2,939,205 | Sutherland et al. | June 7, 1960 |
| 2,960,419 | Emeis | Nov. 15, 1960 |

FOREIGN PATENTS

| | | |
|---|---|---|
| 794,128 | Great Britain | Apr. 30, 1958 |
| 794,674 | Great Britain | May 7, 1958 |
| 216,879 | Australia | Aug. 25, 1958 |
| 332,302 | Switzerland | Oct. 15, 1958 |
| 1,045,549 | Germany | Dec. 4, 1958 |